(12) United States Patent
Endo

(10) Patent No.: US 6,242,081 B1
(45) Date of Patent: Jun. 5, 2001

(54) ORIENTED LAMINATED POLYESTER FILM FOR PASTING ON CAR WINDOW

(75) Inventor: Kazuo Endo, Sakata-gun (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/117,422

(22) PCT Filed: Dec. 2, 1997

(86) PCT No.: PCT/JP97/04397

§ 371 Date: Apr. 16, 1999

§ 102(e) Date: Apr. 16, 1999

(87) PCT Pub. No.: WO98/26929

PCT Pub. Date: Jun. 25, 1998

(30) Foreign Application Priority Data

Dec. 17, 1996 (JP) .................................................. 8-337007

(51) Int. Cl.[7] .......................................................... B32B 7/02
(52) U.S. Cl. ............................................ 428/212; 428/480
(58) Field of Search ................................... 428/212, 213, 428/195, 327, 323, 480, 910

(56) References Cited

U.S. PATENT DOCUMENTS 5,100,719 * 3/1992 Endo et al. ............................ 428/213

FOREIGN PATENT DOCUMENTS

| 1-141735 | * | 6/1989 | (JP) . |
| 7-219131 | * | 8/1995 | (JP) . |
| 8-230126 | * | 9/1996 | (JP) . |
| 10-157040 | * | 6/1998 | (JP) . |
| 10-230577 | * | 9/1998 | (JP) . |

* cited by examiner

*Primary Examiner*—Bruce H. Hess
*Assistant Examiner*—B. Shewareged
(74) *Attorney, Agent, or Firm*—David G. Conlin; Lisa Swiszcz Hazzard; Dike, Bronstein, Roberts & Cushman, LLP

(57) ABSTRACT

The present invention relates to an oriented laminated polyester film for pasting on car windows, comprising at least three layers including intermediate layer(s) being incorporated with a dye, which laminated polyester film satisfies the following conditions simultaneously:

the ratio of the dye concentration (%) in the outermost layers on both sides (CA) to the dye concentration (%) in the intermediate layer (CB) being not more than 0.5, the ratio of the sum of the thicknesses ($\mu$m) of the outermost layers (DA) to the overall thickness ($\mu$m) of the whole layers (DZ) being 0.02 to 0.8, the heat shrinkage (%) in the machine direction and transverse direction of the film when heat-treated at 180° C. for 5 minutes (SMD and STD) being 1.0 to 5.0% and not more than 2.0%, respectively, the center line average roughness ($\mu$m) of the film surface (Ra) being 0.005 to 0.05 $\mu$m, and the film haze (H, %) being not more than 5%.

This laminated film is free from the problem of contamination by the dye during manufacture thereof, shows excellent workability when applied curved glass of an automobile, and also has excellent transparency.

4 Claims, No Drawings

ORIENTED LAMINATED POLYESTER FILM FOR PASTING ON CAR WINDOW

TECHNICAL FIELD

The present invention relates to an oriented laminated polyester film for pasting on car windows. More particularly, it relates to an oriented laminated polyester film for pasting on car windows, which polyester film has a dye-incorporated intermediate layer(s).

BACKGROUND OF ART

Recently, attention is focused on the laminated polyester films having a dye-incorporated intermediate layer(s), for pasting on car windows. In such laminated films, there is a problem that the casting rolls, longitudinal stretching rolls and tenters during manufacture of the films are contaminated due to the sublimation property of the dye even if a dye with high heat resistance is selected.

In Japanese Patent Application Laid-Open (KOKAI) No. 8-230126, in order to solve the above problem, the present inventor has proposed an oriented laminated polyester film for pasting on car window, which polyester film comprises at least three layers comprising two outermost layers containing no dye and an intermediate layer containing a dye, the film satisfying the following three formulae ① to ③ simultaneously.

$$0.02 \leq IB-IA \leq 0.10 \quad ①$$
$$0.05 \leq dA/dB \leq 0.45 \quad ②$$
$$0.05 \leq TA/TB \leq 0.60 \quad ③$$

In the above formulae, IA represents a viscosity of the polyester composition forming the intermediate layer, IB represents a viscosity of the polyester composition forming both outermost layers, dA a represents thickness (μm) of the intermediate layer, dB a represents thickness (μm) of the outermost layers, TA represents a visible light transmittance (%) of the intermediate layer, and TB represents a visible light transmittance (%) of the outermost layers.)

As seen from a film thickness of 10.5 μm/4 μm/10.5 μm shown in the Examples of the above Japanese patent application, the thickness of the intermediate layer of the said laminated film is smaller than the thickness of the outermost layers in due to the definition of the above formula ②. This thickness relation is based on the reason that sublimation of the dye can be prevented by sandwiching the dye-containing intermediate layer between the relatively thick outermost layers.

However, the laminated film based on the above conception, that is, the intermediate layer being smaller in thickness than the outermost layers, involves the following problem. Namely, the dye concentration necessary for obtaining a film of high light screening effect is increased, and consequently, the film haze is elevated because of clouding caused by precipitation of the undissolved dye.

As for the method of pasting (sticking) the said laminated film on curved car window glass, the conventional method comprising pasting several strips of laminated film is being superseded by the one-piece pasting method which is advantageous in cost and appearance. In this case, it is required to prevent wrinkling of the film when it is pasted on a car window. Also, the laminated film is required to have excellent transparency.

However, the laminated film proposed in the said Japanese patent application is not improved in wrinkle resistance and transparency.

DISCLOSURE OF THE INVENTION

The present invention has been made in view of the above circumstances, and the object of the present invention is to provide an oriented laminated polyester film for pasting on car window, which film is free from the problem of sublimation of the dye in the film manufacturing process and is also excellent in workability on application to curved car window glass and excellent in transparency.

As a result of the present inventor's earnest studies, the present it has been found that by forming a film having a specific layer structure, it is possible to prevent sublimation of the dye in the film manufacturing process and imparts the specific properties to the film, so that workability and transparency can be improved. The present invention has been attained on the basis of the above finding.

In an aspect of the present invention, there is provided an oriented laminated polyester film for pasting on car window, comprising at least three layers including intermediate layer (s) being incorporated with a dye, which laminated polyester film satisfies the following formulae ① to ⑥ simultaneously:

$$CA/CB \leq 0.5 \quad ①$$
$$0.02 \leq DA/DZ \leq 0.8 \quad ②$$
$$1.0 \leq SMD \leq 5.0 \quad ③$$
$$STD \leq 2.0 \quad ④$$
$$0.005 \leq Ra \leq 0.05 \quad ⑤$$
$$H \leq 5 \quad ⑥$$

wherein CA represents a dye concentration (%) in the outermost layers on both sides, in case where the dye concentrations in the outermost layers are different, CA represents a dye concentration the outermost layer with a higher dye concentration; CB represents a dye concentration (%) in the intermediate layer, in case where there exist plural intermediate layers, CB represents an average of the dye concentrations in the layers excluding the outermost layers on both sides; DA represents a sum of the thicknesses (μm) of the outermost layers; DZ represents an overall thickness (μm) of the whole layers; SMD represents a heat shrinkage (%) in the machine direction of the film when heat-treated at 180° C. for 5 minutes; STD represents a heat shrinkage (%) in the transverse direction of the film when heat-treated at 180° C. for 5 minutes; Ra represents a center line average roughness (μm) of the film surface; and H represents a film haze (%).

The present invention is described in detail, hereinafter.

The laminated polyester film according to the present invention is produced by stretching the sheet obtained by co-extrusion method and heat-setting it as required. Hereinafter, the present invention is described by showing an embodiment where the film is constituted in a three-layer structure.

The polyester used in the present invention is the one obtained by reacting an aromatic dicarboxylic acid or an ester thereof with a glycol as principal starting materials.

Especially, polyesters in which not less than 80% of the repeating structural units are constituted by the ethylene terephthalate units or ethylene-2,6-naphthalate units, are preferred. Such polyesters may contain a third component.

As the aromatic dicarboxylic acid, there can be used, beside terephthalic acid and 2,6-naphthalene dicarboxylic acid, for instance, isophthalic acid, phthalic acid, adipic acid, sebacic acid and oxycarboxylic acids (such as p-oxyethoxybenzoic acid). As the glycol, there can be used, beside ethylene glycol, for instance, one or more of diethylene glycol, propylene glycol, butanediol, 1,4-cyclohexanedimethanol, neopentyl glycol and the like.

In the present invention, the "outermost layers" are the layers which constitute the two exposed sides of the film. The other layers are all called "intermediate layers". The intrinsic viscosity (IV) of the polyester of the respective layers is usually 0.52 to 0.75, preferably 0.55 to 0.70, more preferably 0.58 to 0.67. If the IV is less than 0.52, it may be difficult to obtain a film having excellent heat resistance and mechanical strength, while if the IV exceeds 0.75, the extrusion step in the film producing process may be overloaded, causing a drop of productivity.

The overall thickness of the laminated film of the present invention is usually 10 to 50 μm, preferably around 25 μm.

In the laminated film of the present invention, the ratio of dye concentration (CA) of the outermost layers to dye concentration (CB) of the intermediate layer(s) (CA/CB) is not more than 0.5, preferably not more than 0.3, more preferably not more than 0.1, even more preferably not more than 0.05. When the CA/CB ratio exceeds 0.5, the dye may tend to sublime in the film manufacturing process, causing contamination of the film production line.

Also, in the laminated film of the present invention, the ratio of the sum of the thicknesses (DA) of the outermost layers to the overall thickness (DZ) of the film (DA/DZ) is 0.02 to 0.8, preferably 0.08 to 0.6, more preferably 0.15 to 0.5. When the DA/DZ ratio is less than 0.02, it may be difficult to satisfactorily prevent sublimation of the dye in the intermediate layer during heat-setting in the film producing process. In case where the DA/DZ ratio exceeds 0.8, the intermediate layer becomes too thin, the dye content required for obtaining a film of high light-screening performance increases too excess. Consequently, the film haze may be elevated due to clouding caused by precipitation of the undissolved dye, and further, the intrinsic viscosity of the polyester may lower, resulting in the loss of characteristic properties of the polyester itself, or the thickness of the intermediate layer may become non-uniform to cause color shading.

As the dye to be contained in the intermediate layer, anthraquinone dyes, phthalocyanine dyes and the like are preferred in terms of chemical structure in view of heat resistance and dispersibility. Disperse dyes and oil-soluble dyes are preferred from the viewpoint of dyeing workability. Usually, several different types of these dyes are properly selected and mixed for use, with the dye content in the polyester, of preferably 0.01 to 10% by weight.

In the outermost layers of the laminated film of the present invention, preferably the fine inactive particles are added to roughen the film surface to impart an appropriate degree of slipperiness to the film, thereby to improve film workability in the film take-up step, the coating step for forming a hard coat described later, and the step for pasting the film with car window glass.

The average size of the fine inactive particles used for the said purpose in the present invention is usually 0.5 to 3.0 μm, preferably 0.8 to 2.0 μm. When the average particle size is less than 0.5 μm, the film workability tends to lower, and when the average particle size exceeds 3.0 μm, the planarity and transparency of the film surface may be impaired. The amount of such fine inactive particles added is usually 0.005 to 1.0 wt %, preferably 0.01 to 0.7 wt % based on the weight of outermost layer. When the amount of the particles added is less than 0.005 wt %, the winding properties of the film tend to deteriorate, and when the particle amount exceeds 1.0 wt %, the film surface tends to be roughened to excess, adversely affecting film transparency.

Examples of the fine inactive particles usable in the present invention include fine particles of silicon oxide, titanium oxide, zeolite, silicon nitride, boron nitride, cerite, calcium carbonate, magnesium carbonate, barium carbonate, calcium sulfate, barium sulfate, calcium phosphate, lithium phosphate, magnesium phosphate, lithium fluoride, aluminum oxide, silicon oxide, titanium oxide, kaolin, talc, carbon black, and fine crosslinked polymer particles such as disclosed in Japanese Patent Publication (KOKOKU) No. 59-5216. Two or more different types of these fine inactive particles may be used in admixture.

The method for containing such inactive particles and dye in the polyester is not specified in the present invention; it is possible to adopt, for example, a method of adding the inactive particles and dye in the polymerization step or a method of incorporating the particles and dye in the polyester to form a masterbatch by using an extruder.

In practical use of the laminated film of the present invention, it is provided with a hard coat layer on the outermost layer which forms surface side when the film is pasted on a car window. Hard coating is utilized in many fields of industrial products for improving scuff resistance of the products, and various types of photopolymers represented by acrylic resins are known as hard coating polymers.

When a hard coat such as mentioned above is directly formed on the surface of a polyester film, satisfactory adhesion may not be provided. So, in the laminated film of the present invention, it is preferred to provide an enhanced adhesion layer to the hard coat. As the coating layer forming agent, there are preferably used water-soluble or water-dispersible polyester-based compositions, polyurethane-based compositions, polyacryl-based compositions, styrene-butadiene copolymer, acrylonitrile-butadiene copolymer and the like.

A crosslinking agent may be contained in the said coating layer to improve blocking resistance, water resistance, solvent resistance and mechanical strength. The crosslinking agents usable in the present invention include hydroxymethylated or hydroxyalkylated urea-based, melamine-based, guanamine-based, alkylamide-based and polyamide-based compounds, epoxy compounds, oxazoline compounds, aziridine compounds, blocked isocyanate compounds, silane coupling agents, dialcohol aluminate-based coupling agents, zirco-aluminate-based coupling agents, peroxides, heat- or light-reactive vinyl compounds, and photosensitive resins.

The said coating layer may contain fine particles for improving slip properties. Such fine particles may be either inactive inorganic particles or organic particles. Examples of the inactive inorganic particles include colloidal silica, alumina, calcium carbonate and titanium dioxide, and the examples of the organic particles include the fine particles obtained from polystyrene-based resins, polyacryl-based resins and polyvinyl-based resins, and their crosslinked particles.

The coating solution used for forming the coating layer may contain defoaming agent, coating properties improver, thickener, low-molecular antistatic agent, organic lubricant, antioxidant, ultraviolet absorber, foaming agent, dye, pigment, etc., if necessary. Further, in case where water is used as the main medium, the coating solution may contain a small quantity of an organic solvent for the purpose of improving water dispersibility or film-forming properties. Preferably an organic solvent is used in such an amount range where the solvent can be dissolved in water.

Examples of the organic solvents usable in the present invention include aliphatic or alicyclic alcohols such as n-butyl alcohol, n-propyl alcohol, isopropyl alcohol, ethyl alcohol and methyl alcohol; glycols such as ethylene glycol, propylene glycol and diethylene glycol; glycol derivatives such as n-butyl cellosolve, ethyl cellosolve, methyl cellosolve and propylene glycol monomethyl ether; ethers such as dioxane and tetrahydrofuran; esters such as ethyl acetate and amyl acetate; ketones such as methylethylketone and acetone; and amides such as N-methylpyrrolidone. These organic solvents may be used as a mixture of two or more of them.

The coating layer thickness, after drying, is usually 0.02 to 0.5 $\mu$m, preferably 0.01 to 0.3 $\mu$m, more preferably 0.03 to 0.2 $\mu$m. When the coating layer thickness exceeds 0.5 $\mu$m, the film may tend to blocking, and especially when the coated and stretched film is re-stretched for elevating the film strength, the film tends to adhere to the rolls in the stretching operation. When the coating layer thickness is less than 0.02 $\mu$m, its adhesion improving effect tends to diminish.

In order to improve coating properties and adhesion of the coating layer to the film, the film may be subjected to a chemical treatment or a discharge treatment before coating. Also, the discharge treatment may be applied on the coating layer side of the film after coating for improving the surface properties of the coating layer.

As for the method for forming such a coating layer, there are usable a system A in which the coating layer is formed in the process of producing a biaxially stretched film, and a system B in which the coating layer is formed after biaxial stretching, and the system A is preferred. The system A also includes a method in which a thin film forming solution is first applied on the surface of a non-stretched film and the coated film is stretched biaxially, and the method in which a thin film forming solution is applied on the surface of a monoaxially stretched film and then the film is further stretched in the direction orthogonal to the initial stretching direction. It is also preferred to use a combination of these methods.

For coating, there can be used various types of coater, such as reverse roll coater, gravure coater, rod coater and air doctor coater.

In order to improve workability of the film when it is pasted on curved car window glass, the laminated film of the present invention has a heat shrinkage of 1.0 to 5.0% in the machine direction (SMD) and not more than 2.0% in the transverse direction (STD). The SMD is preferably 1.5 to 4.0%, and the STD is preferably not more than 1.5%. When the SMD is less than 1.5% or exceeds 5.0%, the film may be wrinkled when it is stuck to a curved glass surface. When the STD is more than 2.0%, the dimensional stability of the film may deteriorate and the spaces may be formed between the film and the glass surface when the film is stuck to a curved glass surface.

The laminated film of the present invention has a center line average roughness (Ra) of the film surface of 0.005 to 0.05 $\mu$m and film haze (H) of not more than 5% for improving transparency. The Ra is preferably 0.01 to 0.04 $\mu$m and the H is preferably not more than 4%, more preferably not more than 2%. When the Ra is less than 0.05 $\mu$m, the film surface may become susceptible to scratching and nonuniform winding of the film may be caused in the film forming step. When the Ra exceeds 0.05 $\mu$m, the roughness degree of the film surface becomes too large and film transparency may be impaired. When the H exceeds 5%, the film may become too high in opaqueness.

The laminated film of the present invention can be produced, for example, by the following process.

First, a polyester (for the intermediate layer) incorporated with a specified amount of a dye and a polyester (for the outermost layers) which may optionally be incorporated with a specified amount of inactive particles are supplied to the respective melt extruders and melted by heating to the temperatures above the melting points of the respective polyesters.

Then, the polyesters are laminated in a state of laminar flow in the die head and extruded from a slit die onto a rotating cooling drum, whereby the extrudate is quenched to a temperature below the glass transition points of the polyesters and solidified to obtain a substantially amorphous non-oriented sheet. In this operation, an electrostatic pinning method and/or a liquid coating adhesion technique are preferably employed for enhancing adhesion between the sheet and the cooling drum to improve planarity of the sheet.

Next, the said sheet is stretched biaxially to obtain a film. In this case, it is preferred that the sheet is first stretched 2 to 6 times in the machine direction at 70 to 145° C., then further stretched 2 to 6 times in the transverse direction at 90 to 160° C. and heat-treated at 150 to 250° C. for 1 to 600 seconds. The film is also preferably relaxed 0.1 to 20% in the machine and/or transverse directions in the highest temperature zone of the heat-treatment and/or the cleaning zone at the terminal of the heat-treatment. If necessary, restretching in the machine and transverse directions may be conducted.

BEST MODE FOR PERFORMING THE INVENTION

The present invention is described in more detail by showing the embodiments thereof, but it is to be understood that the present invention is not limited to these embodiments and receptive to ordinary changes and modifications in the technical field of the present invention without departing from the scope of the present invention. The physical properties of the products were determined by the following methods.

(1) Viscosity (IV)

1 g of polymer was dissolved in 100 ml of a phenol/tetrachloroethane (1/1 by weight) mixed solvent, and the viscosity of this solution was measured at 30° C.

(2) Thickness of each layer of the film

A small piece of each sample film was fixed with an epoxy resin and cut by a microtome, and the film section was observed by the transmission electron micrographs. In the micrographs, the interface is observed as two bright and dark stripes substantially parallel to the film surface. The distance from the interface of the two stripes to the film surface was measured from 10 micrographs and the average of the measured values was shown as the layer thickness.

(3) Average particle size

The particle size was measured according to the precipitation method based on the Stokes' low using a centrifugal precipitation type particle size distribution meter ("SA-CP3" mfd. by Shimadzu Corp.). The value of 50% of the integration (based on the volume) in the equivalent globurality distribution of the particles obtained by the above measurement was shown as average particle size.

(4) Heat shrinkage (SMD and STD)

Using a circulating hot air oven (mfd. by Tabai Seisakusho Ltd.), each 25 μm thick no-tension sample film was heat-treated in an atmosphere of 180° C. for 5 minutes and the film lengths in the machine direction (SMD) and in the transverse direction (STD) before and after the heat-treatment were measured. Heat shrinkage was calculated from the following equation, and the average of the measurements on 5 samples was shown.

Heat shrinkage (%) $(l_0-l_1)/l^0 \times 100$

In the above formula, $l_0$ indicates sample length (mm) before heat treatment, and $l_1$ indicates sample length (mm) after heat treatment. In case where $l_0$ became smaller than $l_1$ (in the case of expansion), the measured value was expressed with a minus mark (−)

(5) Center line average roughness (Ra)

Center line average roughness (Ra) of the film surface was determined according to JIS-B0601 using a surface roughness tester SE-3F mfd. by Kosaka Kenkyusho KK. Namely, in accordance with JIS-B060 1, the center line average roughness ($R_a$), is determined as follows. A portion of sampling length (L) is taken out in the direction of the center line from the roughness curve (75%). The center line of the taken out portion and the axis of ordinate thereto represent "x" axis and "y" axis, respectfully. When the roughness curve (75%) is represented as a function y=f(x), $R_a$ is defined by the following equation (units in μm):

$R_a = (1/L) \int |f(x)| dx$ where L is the sampling length. The cut off value, $\lambda_c$, is the following 6 values (units in mm): 0.08, 0.25, 0.8, 2.5, 8, 25.

As the standard cut off value ($\lambda_c$) the following values shown in Table 2 are usually used.

TABLE 2

Standard Value Used For The Determination Of $\lambda_{c75}$

| Range of $R_a$ (μm) | | Cut Off Value (75%) |
| --- | --- | --- |
| More Than | Not More Than | $\lambda_c$ (mm) |
| — | 12.5 | 0.8 |
| 12.5 | 100 | 2.5 |

In principle, Ra is determined after the $\lambda_c$ value is determined. However, whenever indicating the center line average roughness, it is disadvantageous to determine $R_a$. Therefore, the above value shown in Table 1 is usually used. The sampling length is not less than three times the $\lambda_c$ value. Feeler end radius=2 μm; load=3 mg; cut-off =0.08 mm.

(6) Film haze

Cloudiness of the film was determined according to JIS-K7105 using a turbidi meter NDH-300A mfd. by Nippon Denshoku Kogyo KK.

(7) Color shading

Visible light transmittance of the film was measured in the width direction of the film at intervals of 10 cm at ten points according to JIS-A5759. Tests of optical properties are performed in accordance with JIS-A5759 as follows. A test sample is prepared by taking a glass plate having a width of 70 mm, length of 150 mm and thickness of 3 mm and washing it well with water. A test film having the same size of the glass plate is pasted on the glass plate (hereinafter referred to as (B) plate). Three specimens are prepared. The (B) plate is allowed to stand for at least 24 hours.

Visible light transmittance tests are then carried out. The visible light transmittance of the (B) plate is measured by any one of the following two methods.

(1.) Each transmittance at the wave length of 380–780 nm in an interval of 10 nm (at 41 wave length) is measured using a spectrophotometer. The visible light transmittance is calculated by the following equation.

$$T_v = \frac{\sum_{380}^{780} P\lambda_1 V\lambda_1 T\lambda_1}{\sum_{380}^{780} P\lambda_1 V\lambda_1} \times 100$$

Where:

$P\lambda_j$: a value of spectrophotoscopic distribution in a standard photo A $V\lambda_j$: a spectral luminous efficiency in photopic vision in visual field of 2°

$T\lambda_j$: visible light transmittance

When the distribution curve of transmittance in a measurement of film shows a vibration waveform, average distribution curve between each maximum value and minimum value is prepared, and by using thereof, each transmittance is measured at each wave length and the visible light transmittance is calculated by the above equation.

(2.) A film for adapting spectral luminous is combined with a photoelectric detector of a spectrophotometer. The spectrosensitivity thereof is almost corresponded to a spectral luminous efficiency in photopic vision ($V\lambda_j$) and the transmittance for the standard photo is measured, and color shading was rated according to the following criterion:

○: Tv (min)/Tv (max)≦2%

X: Tv (min)/Tv (max) >2%

Tv (min) minimum value of visible light transmittance in the measurements; Tv (max)=maximum value thereof.

(8) Workability

The condition of the wrinkles and the spaces in the periphery formed after pasting the film on curved car window glass was observed, and workability of the film was rated according to the following criterion:

○: No wrinkle formed, and the spaces in the periphery were uniform.

X: The film was wrinkled, and the spaces in the periphery were non-uniform.

(9) Adherence to hard coat (HC)

The film surface was coated with a hard coating agent of the composition shown below by a #20 bar, then dried at 90° C. for one minute to remove the solvent, and further dried by irradiation with light from a high-pressure mercury arc lamp under the following conditions: output=120 W/cm; irradiation distance=15 cm; rate of movement=10 m/min, to form a 9 $\mu$m hard coat. Then the hard coat was crosscut to form 100 squares, each being one inch wide, and subjected to a peel test by a 90° pull-up method (rate of pulling: 2 inch/min), and adherence was evaluated according to the following criterion:

○: number of squares which peeled off ≦5

Δ: 5<number of squares which peeled off <20

X : number of squares which peeled off ≦20

Hard coat composition

Acrylic resin (Seikabeam EXY-26(S) mfd. by Dainichi Seika Kogyo KK): 30 parts by weight Methyl ethyl ketone: 35 parts by weight Toluene: 35 parts by weight <Preparation of polyester (A)>

100 parts by weight of dimethyl terephthalate, 60 parts by weight of ethylene glycol and 0.09 part by weight of magnesium acetate tetrahydrate as catalyst were supplied to and reacted in a reactor, initiating the reaction at 150° C. and raising the reaction temperature gradually with evaporation of methanol to reach 230° C. in 3 hours. 4 hours later, the ester exchange reaction was substantially completed. To the resulting reaction mixture were added 0.04 part by weight of ethyl acid phosphate, 0.04 part by weight of antimony trioxide and 0.05 part by weight of silica particles having an average particle size of 1.85 $\mu$m to carry out a polycondensation reaction for 4 hours. The reaction temperature was gradually raised from 230° C. till reaching 280° C. while the reaction pressure was gradually lowered from normal pressure till finally reaching 0.3 mmHg. Upon passage of 4 hours from start of the reaction, the reaction was stopped and the produced polymer was discharged out under nitrogen gas pressure. Viscosity of the obtained polyester was 0.65.

<Preparation of polyester (B) and polyester (B1)>

The same procedure as used for the preparation of polyester (A) was conducted except that the polycondensation reaction was carried out for 3 hours and 15 minutes without adding silica particles to obtain a polyester (B) with a viscosity of 0.53. This polyester (B) was further subjected to solid phase polymerization under the conditions of 225° C. and −0.3 mmHg for 15 hours to obtain a polyester (B1) having a viscosity of 0.78.

<Preparation of polyester (C)>

Using a vented double-screw extruder, 0.4 part by weight of a red dye ("Diaresin Red HS" produced by Mitsubishi Chemical Corporation), 0.8 part by weight of a blue dye ("Blue H3G" produced by Mitsubishi Chemical Corporation) and 0.3 part by weight of a yellow dye ("Yellow F" produced by Mitsubishi Chemical Corporation) were melt mixed with 100 parts by weight of the dried polyester (B1) to obtain a polyester (C) having a viscosity of 0.61.

<Preparation of polyester (D)>

The same procedure as used for the preparation of polyester (A) was conducted except that instead of the silica particles of 0.05 part by weight having an average size of 1.85 $\mu$m, the silica particles of 0.05 part by weight having an average size of 3.24 $\mu$m were used to obtain a polyester (D).

<Preparation of polyester (D)>

The same procedure as used for the preparation of polyester (A) was conducted except that instead of the silica particles of 0.05 part by weight having an average size of 1.85 $\mu$m, the silica particles of 0.2 part by weight having an average size of 1.85 $\mu$m were used to obtain a polyester (E).

EXAMPLE 1

Polyester (C) dried at 180° C. for 4 hours was supplied to a main single-screw extruder set at 285° C. while polyester (A) was supplied to a vented double-screw sub-extruder set at 285° C., and they were extruded into the form of a sheet, with polyester (A) being so distributed that it would be present in the two layers (outermost layers) on both sides of the polyester (C) layer, and rapidly cooled and solidified on a rotating cooling drum with a surface temperature of 30° C. to obtain a 342 $\mu$m thick amorphous sheet. This amorphous sheet was stretched 3.6 times in the machine direction at 83° C. and 3.8 times transversely at 90° C., then heat treated at 225° C. for 3 seconds and relaxed 5% at 185° C. for 2 seconds to obtain a 3 $\mu$m/19 $\mu$m/3 $\mu$m three-layer biaxially oriented film with an overall thickness of 25 $\mu$m.

EXAMPLE 2

The same procedure as defined in Example 1 was conducted except that, after 3.6-fold stretching in the machine direction at 83° C., an aqueous coating material comprising 65 parts by weight of a polyurethane resin ("Hydran AP-40" produced by Dainippon Ink and Chemicals Inc.), 20 parts by weight of a polyester resin ("Finetex ES-670" produced by Dainippon Ink and Chemicals Inc.), 10 parts by weight of a melamine crosslinking agent ("Beckamine J-101" produced by Dainippon Ink and Chemicals Inc.) and 5 parts by weight of colloical silica ("Snowtex YL" produced by Nissan Chemical Industry Co., Ltd.) was applied on one side of the sheet to a coating thickness after drying of 0.1 $\mu$m, and then the sheet was further stretched 3.8 times in the transverse direction at 93° C. to obtain a biaxially stretched film.

COMPARATIVE EXAMPLE 1

The same procedure as defined in Example 1 was conducted except that a mixture of 33 parts by weight of polyester (A) and 67 parts by weight of polyester (C) was supplied to the sub-extruder instead of supplying polyester (A) alone to obtain a biaxially stretched film.

COMPARATIVE EXAMPLE 2

The same procedure as defined in Example 1 was conducted except that layer thickness was altered to be 0.1 $\mu$m/24.8 $\mu$m/0.1 $\mu$m to obtain a biaxially stretched film.

COMPARATIVE EXAMPLE 3

The procedure of Example 1 was carried out except that layer thickness was altered to be 11 $\mu$m/3 $\mu$m/11 $\mu$m to obtain a biaxially stretched film.

COMPARATIVE EXAMPLE 4

The same procedure as defined in Example 1 was conducted except that, after transverse stretching, the sheet was heat-treated at 240° C. for 3 seconds and then relaxed 12% at 185° C. for 2 seconds to obtain a biaxially stretched film.

COMPARATIVE EXAMPLE 5

The procedure of Example 1 was carried out except that, after transverse stretching, the sheet was heat-treated at 210° C. for 3 seconds and then relaxed 12% at 185° C. for 2 seconds to obtain a biaxially stretched film.

COMPARATIVE EXAMPLE 6

The same procedure as defined in Example 1 was conducted except that after heat treatment at 225° C. for 3 seconds, no relaxing treatment was conducted to obtain a biaxially stretched film.

COMPARATIVE EXAMPLE 7

The same procedure as defined in Example 1 was conducted except that polyester (D), instead of polyester (A), was supplied to the sub-extruder set at 285° C. to obtain a biaxially stretched film.

COMPARATIVE EXAMPLE 8

The same procedure as defined in Example 1 was conducted except that instead of polyester (A), polyester (E) was supplied to the sub-extruder at 285° C. to obtain a biaxially stretched film.

The properties of the obtained biaxially stretched polyester films are shown collectively in Table 1.

TABLE 1

|  | Example 1 | Example 2 | Comp. Example 1 | Comp. Example 2 | Comp. Example 3 |
|---|---|---|---|---|---|
| CA/CB | 0 | 0 | 0.7 | 0 | 0 |
| DA/DB | 0.24 | 0.24 | 0.24 | 0.01 | 0.88 |
| SMD | 3.5 | 3.5 | 3.4 | 3.2 | 3.4 |
| STD | −0.7 | 0.6 | −0.6 | −0.6 | −0.7 |
| Ra | 0.023 | 0.024 | 0.022 | 0.031 | 0.021 |
| H | 1.5 | 1.6 | 1.6 | 0.9 | 3.5 |
| Tenter contamination | ○ | ○ | X | X | ○ |
| Color shading | ○ | ○ | ○ | ○ | X |
| Workability | ○ | ○ | ○ | ○ | ○ |
| Adherence to HC layer | Δ | ○ | Δ | Δ | Δ |
| Comprehensive evaluation | ○ | ⊚ | X | X | X |

|  | Comp. Example 4 | Comp. Example 5 | Comp. Example 6 | Comp. Example 7 | Comp. Example 8 |
|---|---|---|---|---|---|
| CA/CB | 0 | 0 | 0 | 0 | 0 |
| DA/DB | 0.24 | 0.24 | 0.24 | 0.24 | 0.24 |
| SMD | 0.5 | 7.5 | 2.3 | 3.4 | 3.5 |
| STD | 0.7 | −0.3 | 4.0 | −0.6 | −0.6 |
| Ra | 0.022 | 0.023 | 0.023 | 0.056 | 0.034 |
| H | 1.6 | 1.6 | 1.5 | 3.8 | 6.7 |
| Tenter contamination | ○ | ○ | ○ | ○ | ○ |
| Color shading | ○ | ○ | ○ | ○ | ○ |
| Workability | X | X | X | ○ | ○ |
| Adherence to HC layer | Δ | Δ | Δ | Δ | Δ |
| Comprehensive evaluation | X | X | X | X | X |

INDUSTRIAL APPLICABILITY

According to the present invention, there is provided an oriented laminated polyester film for pasting on car window, which polyester film has a dye-incorporated intermediate layer(s), which film is free from the problem of contamination by the dye during manufacture thereof, shows excellent workability when applied on curved glass of an automobile and also has excellent transparency.

-- Testing Methods for Optical Properties of Plastics

1. Scope

This Japanese Industrial Standard specifies the testing methods for optical properties of plastic materials(1).
   Note (1) Plastic materials herein mean plastic materials in filmy and platy forms and of formed products. In the case of the yellowness testing method, plastic materials shall also include those in the form of powder, pellets, filament and liquid.

2. Definitions

The definitions of the main terms used in this standard shall be as specified in JIS K 6900, JIS Z 8105, JIS Z 8113 and JIS Z 8120 and shall also be as specified below:

(1) light receiving angle  The angle formed between the optical axis of the light receiving system and the normal line to the specimen surface.

(2) specular glossiness  The ratio of reflected light flux to incident light flux in specular reflection.

(3) transfer standard white surface  The transfer standard white surface shall be a surface prepared by forming a barium sulfate powder, in which the spectral reflectance factor has been graduated by calibration. The transfer standard white surface shall be used for calibration of working standard white surfaces.

(4) working standard white surface  A durable white surface of known spectral reflectance factor, which is normally used as a standard for comparison in the measurement of spectral reflectance factor.

(5) glare-proofness  The degree in which glare is prevented.

(6) yellowness  The degree in which the hue removes from colorless or white toward yellow, which is expressed as a positive quantity. Consequently, when this is obtained by calculation as a negative value, it means that the hue transfers to the direction of blue.

(7) yellowing factor  A factor used for evaluation of the degree of deterioration of plastic materials exposed to an environment such as light, heat and the like, which is expressed by the difference between the initial yellowness and that obtained after exposure.

(8) retrogressive reflection  The phenomenon in which light is reflected toward the direction of illumination.

(9) image clarity  The property of the surface of a coating which reproduces the image of an object facing the coating surface.

(10) distinctness of image  The degree of distinctness of an image whit is transmitted or reflected.

3. Classification of Tests

The tests shall be classified as follows:
(1) General Optical Characteristics
   (a) Refractive index
   (b) Glossiness
   (c) Colour
   (d) Colour difference
   (e) Light transmittance and total light reflectance (2) Special Optical Characteristics
   (a) Optical angular deviation
   (b) Glare-proofness
   (c) Yellowness and yellowing factor
   (d) Haze (cloudiness value)
   (e) Retrogressive reflection property
   (f) Distinctness of image
   (g) Fluorescent colour 4. General Requirements of Test

4.1 Preparation of Specimen and Test Piece The specimens shall be taken from a lot in which all parts can be regarded to have the same quality by a rational method in accordance with JIS Z 9031. Where the specimen taken is a filmy, platy or formed product, it shall be used as it stands as the test piece. Where the specimen taken is in the form of a powder, pellets, filament and liquid, it shall be prepared into a test piece in the form of a filmy, platy and formed product on agreement between the parties concerned. However, in yellowness and yellowing factor tests, the product may be used as it stands as specimen. The number of test pieces used shall be one or more unless otherwise specified.

4.2 Conditioning of Test Piece Test pieces shall be conditioned, before being tested, in a dark place at $23 \pm 2°C$ and $50 \pm 5\%$ relative humidity for 48 hours or longer, as a rule. However, for those test pieces which exhibit reversible changes in hue due to light or heat, they shall be conditioned as specified on agreement between the parties concerned.

4.3 Standard Atmospheric Conditions of Testing Place The standard atmospheric conditions of the testing place shall be the conditions in a room at a temperature of $23 \pm 5°C$ and relative humidity of $50 \pm 20\%$.

4.4 Pretreatment of Test Piece The test pieces shall preliminarily be freed from dust, stains and the like by using a clean, soft cloth and the like with care not to impair their surfaces.

4.5 Handling of Numerical Values of Test Results The test results shall be calculated by either of the methods (1) and (2) mentioned below. Further, if required, the standard deviation shall be calculated according to method (3).

(1) Where the Number of Test Pieces Are Specified Test results shall be calculated to the place lower by one place than the figures specified for each test item by averaging the measured values obtained from respective test pieces or the values obtained by calculation, and the average value shall be rounded to the number of figures specified in JIS Z 8401.

(2) Where the Number of Test Pieces Is Not Specified  The results shall be calculated to the place lower by one place than the figures specified for each item by averaging three measured values obtained by measuring at three positions of one test piece or three values obtained by calculation by using such measured values and the average value shall be rounded to the number of figures specified in JIS Z 8401.

(2) Where the standard deviation (assumed) is calculated, the value calculated by the following formula shall be rounded into two significant figures in accordance with JIS Z 8401.

$$S = \sqrt{\frac{\sum \bar{x} - x}{n-1}}$$

where
- S: standard deviation (assumed)
- x: each observed value
- $\bar{x}$: average value for observed group
- n: number of observations 5. Testing Methods for General Optical Characteristics 5.1 Refractive Index 5.1.1 Summary  The refractive index shall be obtained as the ratio of the velocity of light in the vacuum (practically air) to the velocity of light in the transparent specimen and be expressed by the ratio of the sine of the angle of incidence to the sine of the angle of refraction.

5.1.2 Apparatus
   (1) Abbe Refractometer  A refractometer having a measuring range for refractive index of 1.45 to 1.62 and a minimum graduation value of 0.001, capable of thermal insulation of the prism section. The principle of the refractometer is shown below in Fig. 1:

Fig. 1 - Abbe Refractometer Telescope

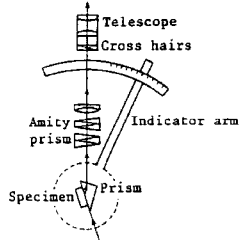

(2) <u>Constant-Temperature Water Bath</u> A water bath capable of adjusts the temperature to 23 ± 0.5°C. It is preferable to use pure water for the circulating water.

(3) <u>Light Source</u> For the light source, natural light shall be used, as a rule, but, where it is not available, the light of an incandescent lamp having as little yellowness as possible may also be used.
   Other light sources may also be used on agreement between the parties concerned.

5.1.3 <u>Preparation of Aparatus</u> The preparation of the apparatus shall be performed as follows:

(1) The refractometer shall be installed in a room capable of obtaining natural light(2), a thermometer shall be installed at a specifier position of the prism case, and circulating water shal' be passed(3) from the constant-temperature water bath to adjust the temperature so that the thermometer attached to the refractometer shows 23°C. The prism in the refractometer shall be maintained at this temperature during the test.

Notes (2) No direct sunlight shall be applied to the refractometer.
(3) Care shall be taken so that the circulating water does not leak out and wet the light incidence window or refracted light window of the refractometer. It is preferable, for this purpose, to draw the water by installing a circulation pump at the outlet of the prism case.

(2) After opening the prism case, both prism surfaces and then the surface of the prism-fixing metal shall be lightly wiped with soft sanitary cotton or the like wet with ethyl alcohol or water. This procedure shall be repeated until no running marks remain on the prism surface, (3) When the refractometer is not in use, the whole apparatus shall be cleaned and preserved in a dry atmosphere with little temperature change. Particularly, the prism surface shall always be maintained in a condition with little moisture(4), oil, dust or the like.

Note (4) Because the prism is made of heavy flint glass which has low resistance to moisture, the prism surfaces shall not be left wet for a long period.

5.1.4 <u>Test Piece</u> Test pieces shall be prepared as follows:

(1) The dimensions of the test piece shall be 10mm x 20 mm and the thickness shall be the original thickness.

(2) The number of test pieces shall be 5.

(3) The surface to contact the prism surface and the light receiving surface of the test piece shall be thoroughly polished to smooth ness.

5.1.5 <u>Contact Fluid</u>  The contact fluid used she:! have a refractive index higher than that of the test piece and shall not corrode the test piece. Generally, α-bromonaphthalene, saturated solution of mercury potassium iodide or the like is used.

5.1.6 <u>Measuring Method</u>  Measurement shall be performed as follows:

(1) Clean all the polished surfaces of the tes: piece, let fall from a glass rod with a rounded end a drop(5) or a suitable contact fluid onto the center of the test piece surface to be contacted with the prism of the refractometer, open the prism case, and gently push a polished surface of the tes: piece on the prism, with the surface directed toward the direction of incidence of light of the refractometer. Make the contact so that the fluid film spread all over and the test piece and the prism become perfectly parallel.

Note  (5) The contact fluid shall thoroughly spread over the contact surface but shall not ooze out to the edge of the surface of light incidence.

(2) After turning the eyepiece of the telescope and adjusting the focus to the cross hairs in the visual field as shown in Fig. 2, introduce light into the prism by moving the reflecting mirror, turn the prism to make the boundary line between the light and the dark almost fall on the intersecting point of the cross hairs in the visual field, and let the colour or the boundary line vanish by turning the adjusting knob toward either left or right. here again, adjust the reflecting mirror to such a position that the colour change of the boundary line can be observed most easily After equilibrizing the temperature for about 5 minutes, make the boundary line accurately agree with the intersecting point of the cross hairs and read the index of refraction to the four places of decimals. Further, obtain the mean dispersion to the four places of decimals from the dispersion table appended to the refractometer Fig. 2 – Prism Visual Field

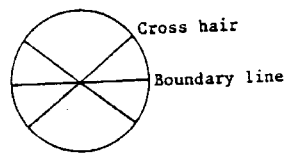

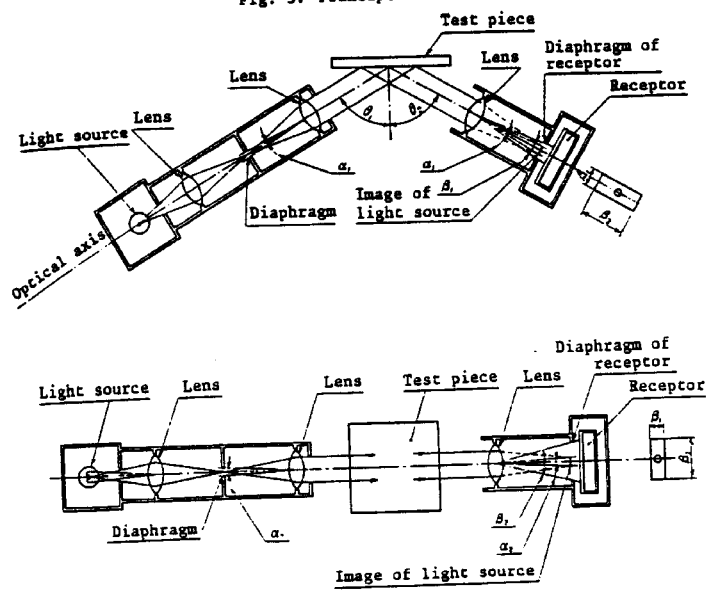
Fig. 3. Principle of Glossmeter 5.1.7 Expression of Results   The refractive index shall be expressed to three places of decimals. Further, if required, the mean dispersion obtained from the dispersion table shall be attached.

5.2 Glossiness 5.2.1 Summary The light from the standard light source shall be applied to the specimen surface at a specified angle and the regular reflection component shall be measured by a light receptor.

5.2. 2 Classification of Glossiness   Glossiness shall be classified as follows. Provided that the 60-degree specular glossiness shall be adopted as a standard, but glossiness of the other angles may also be used on agreement between the parties concerned.

(1) 60-degree specular glossiness
(2) 45-degree specular glossiness
(3) 20-degree specular glossiness 5.2.3 Standard Surface for Specular Glossiness   As the standard surfaces for specular glossiness, the following standard surface, primary standard surface or secondary standard surface shall be used.

(1) The standard surface shall be the surface of glass having a refractive index of 1.567, and the corresponding glossiness value shall be expressed as 100 (%).

(2) The primary standard surface shall be a transparent or black glass surface of known refractive index.

(3) The secondary standard surface shall be a lustrous plate having high, medium or low glossiness, which has been calibrated based on the primary standard surface.

5.2.4 Apparatus   The principle of the glossiness measuring apparatus, hereinafter referred to as the "glossmeter", is shown in Fig. 3. The glossmeter shall have such a construction that, when a light flux of a specified divergence angle is applied to the specimen surface at a specified angle of incidence, the light flux of a specified divergence angle which is reflected just in :he opposite direction can be measured by receptor. Further, the apparatus shall meet the requirements of Table 1, and the synthetic sensitivity of the light source, filter and receptor shall satisfy the value of Y of the Luther condition for the standard light C.

Table 1 - Measuring Conditions

| Kind off glossiness / Measuring condition | | 60-degree specular glossiness | 45-degree specular glossiness | 20-degree specular glossiness |
|---|---|---|---|---|
| Angle of incidence ($\theta_1$) | | $60 \pm 0.1°$ | $45 \pm 0.1°$ | $20 \pm 0.1°$ |
| Light receiving angle ($\theta_2$) | | $60 \pm 0.1°$ | $45 \pm 0.1°$ | $20 \pm 0.1°$ |
| Divergence angle of light source | In plane of incidence ($a_1$) | $0.75 \pm 0.25°$ | $0.75 \pm 0.25°$ | $0.75 \pm 0.25°$ |
| | In normal plane ($a_2$) | $0.75 \pm 0.25°$ | $0.75 \pm 0.25°$ | $0.75 \pm 0.25°$ |
| Divergence angle of receptor | In plane of incidence ($\beta_1$) | $4.4 \pm 0.1°$ | $4.4 \pm 0.1°$ | $1.8 \pm 0.05°$ |
| | In normal plane ($\beta_1$) | $11.7 \pm 0.2°$ | $11.7 \pm 0.2°$ | $3.6 \pm 0.1°$ |

5.2.5 <u>Test Piece</u>  The test piece shall be as follows:

(1) The dimensions of the test piece shall be 50 mm x 50 mm or larger as a rule, and the thickness shall be the original thickness. However, for filmy products, the dimensions shall be 100 mm x100 mm, as a rule.

(2) The number of test pieces used shall be 3.

5.2.6 <u>Measuring Method</u> After the glossmeter is standardized by using a primary standard surface or secondary standard surface, the glossiness of the specimen shall be measured under the following conditions:

(1) <u>For Platy Products</u> In the case of measurement of platy specimens. the specimen shall be backed with black felt or the like and held firmly by a specimen holder to prevent the specimen from warpage. Measurement shall be performed by further shielding the specimen with a suitable camera obscure to prevent the influence of outside light.

(2) <u>For Filmy Products</u> For measuring a specimen which is filmy or is; likely to bend during measurement, the specimen shall be fixed by, for example, a specimen holder subjected to blackening treatment as shown in Fig. 4. Measurement shall be performed after further shielding the specimen with a camera obscure, as in the case of a platy specimen.

Remark: Where a specimen having a glossiness value of 100 or higher is subjected to measurement by a glossmeter having a maximum graduation of 100, the glossmeter shall be preliminarily adjusted so that the glossiness value of the primary standard surface is ½, and two times the value obtained by measurement of the specimen shall be taken as the glossiness value of the specimen.

Fig. 4 – Specimen Holder (Example)

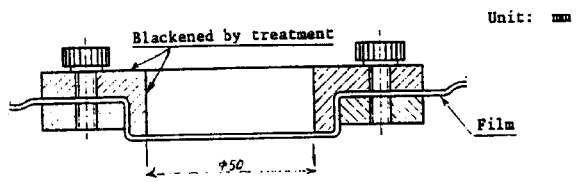

5.2.7 <u>Expression of Results</u> The glossiness shall be expressed, as shown in the following Example, by appending the angle of glossiness in parentheses after the symbol of glossiness $G_s$ and expressing the glossiness value in integer.

In this case, the symbol % may be omitted.

Example: $G_s(60°) = 76\%$ 5.3 <u>Colour</u>

5.3.1 <u>Summary</u> The characteristics of visible radiation or the aspects Of visual perception, according to which the differences in the properties Of the colour are recognized depending on the differences in the spectral energy distribution of light, shall be indicated by the tristimulus values and chromaticity coordinates or the hue, lightness and saturation.

5.3.2 <u>Classification of Colour Measuring Methods</u> The measuring methods for colour shall be classified as follows:

(1) Spectrocolorimetric method (2) Stimulus value direct reading method 5.3.3 <u>Apparatus</u> The following spectrophotometer or photoelectric calorimeter shall be used as the measuring apparatus:

(1) The spectrophotometer used for measurement in the case of the spectrocolorimetric method shall be as specified in 4.2 of JIS Z 8722.

(2) The photoelectric calorimeter used for measurement in the case of the stimulus value direct reading method shall be as specified in 5.2 of JIS Z 8722.

5.3.4 Test Piece The size of the test niece shall be larger than the size of the test piece fitting window of the measuring apparatus, and the width shall be the original thickness. However, where the specimen is thick and translucent and the loss of light by dispersion by the scattering of light in the direction of thickness is large. a white paint shall be applied on the side surfaces of the test piece.

5.3.5 Measuring Method Measurement shall be performed in accordance with the following:

(1) The conditions of measurement shall be as follows:

(a) In the Case of Reflection Measurement For backing of the test piece, as a rule, black felt or a light trap shall be used. In this case, where the specimen is translucent, an integrating sphere type photometer shall be used.
In the case where the specimen is transparent or translucent, a working standard white surface or, on agreement between the parties concerned, a white enamelled plate or the like may be used. In this case, however, it is desirable to append the tristimulus values of the white plate used.

Remark: In the case where an integrating sphere type photometer is used, measurement shall be performed in accordance with 5.5.3, as appropriate.

(b) In the Case of Transmission Measurement In the case of transmission measurement, measurement shall be performed in accordance with 4.4 of JIS Z 8722.

Remark: Where a specimen having diffuse transmission light of a haze value exceeding 3 % is subjected to measurement, measurement shall be performed by using an apparatus which measures by collecting all the light beams transmitted through the specimen (integrating sphere type transmittance measuring (apparatus).
However, where the thickness of the specimen is large, the same measuring method as in the case of (a) shall be used.

(2) The tristimulus values X, Y and Z shall be measured by using a spectrophotometer or photoelectric calorimeter. Remark: Although, as a rule, the standard light C shall be used, the standard light $D_{65}$ or the standard light A may also be used on agreement between the parties concerned.

5.3.6 Method of Calculation The chromaticity coordinates x and y shall be calculated from the following formulae by using the tristimulus values X, Y and Z obtained by measurement:

$$x = \frac{X}{X + Y + Z}$$

$$y = \frac{Y}{X + Y + Z}$$

5.3. Expression of Results The measured values shall be expressed by the stimulus value Y calculated to the 1st decimal place and the chromaticity coordinates x and y calculated to the 3rd decimal place. Further, the measured values shall be appended with the symbols specified in 6.3.2 of JIS Z 8722 and the designation of the apparatus used for measurement, as shown in the following Examples:

Examples  1.    Y=25.8%,   x=0.473,   y=0.381,   0-d    spectrophotometer

2.    Y=19.7%,   x=0.302,   y=0.407,   45-0   photoelectric colorimeter

Remark: The methods of expressing colour include, in addition to the above, $L_{ab}$ $H.V.C.$ (H: hue, V: lightness, C: saturation) and so forth.

5 4 Colour Difference 5.4.1 Summary The differences in colour by colour vision shall be obtained quantitatively from the tristimulus values X, Y and Z obtained according to 5.3.

5.4.2 Rinds of Colour Difference The kinds of colour difference used shall be $L^*a^*b^*$, $L^*u^*v^*$ and $L_{ab}$, but as a rule, the colour difference indication based on the CIE 1976 $L^*a^*b^*$. system shall be used. However, other colour difference indication systems may also be used on agreement between the parties concerned.

The values of $L^*$, $a^*$ and $b^*$ shall be calculated from the tristimulus values X, Y and Z according to the following formulas:

$L^* = 116(Y/Y_0)^{1/3} - 16$           $1 \leq Y \leq 100$ $a^* = 500[(X/X_0)^{1/3} - (Y/Y_0)^{1/3}]$ $b^* = 200[(Y/Y_0)^{1/3} - (Z/Z_0)^{1/3}]$ In the above formulas, $X_0$, $Y_0$, and $Z_0$ are the tristimulus values of the transfer standard white surface, which are shown in Table 2.

Table 2. Tristimulus Values of Transfer Standard White Surface

| Standard Light | $X_0$ | $Y_0$ | $Z_0$ |
| --- | --- | --- | --- |
| C | 97.19 | 99.16 | 117.27 |
| $D_{65}$ (for reference) | 94.19 | 99.16 | 108.01 |
| A (for reference) | 108.83 | 99.13 | 35.30 |

5.4.3 <u>Method of Calculation</u> The colour difference shall be calculated from the values of L*, a* and b* of the specimen according to the following formula:

$$\Delta E_{ab}^* = [(\Delta L^*)^2 + (\Delta a^*)^2 + (\Delta b^*)^2]^{1/2}$$

where $\Delta E_{ab}^*$ : colour difference

Remarks: 
1. Two specimens whose colour difference is measured shall be subjected to measurement by using measuring apparatuses having the same optical conditions.
2. It is desirable to make measurement at three locations of each specimen and calculate the colour difference by using the average value obtained therefrom.
3. In the case where the test requires a long period in a weather (light) resistance test such as an outdoor exposure test, the original specimen (unexposed test piece) preserved for measurement of colour change sometimes undergoes a change during storage, so that it is desirable to preliminarily subject to measurement the original specimen simultaneously with the test piece before undertaking the test and confirm the presence of changes during storage by comparing the value of the test piece with that of the original specimen measured at the same time after completion of the test. If any changes during storage are affirmed, it is desirable to take the value of each test piece measured before starting the test as the initial value and calculate the colour difference between this initial value and the value measured after the test.

5.4.4 <u>Expression of Results</u> The colour difference shall be calculated to the 1st decimal place and the kind of colour difference shall be written after the symbol of colour difference ΔE, as shown in the following Example:

Example: $\Delta E_{ab}^* = 1.3$

Reference: In the case where the direction of discoloration is indicated in a weather (light) resistance test, a method of expression such as the following example may also be used by appending the symbol(s) in Table 3 after the expression of colour difference.

Table 3

| Direction of discoloration | Symbol | Direction of discoloration | Symbol | Direction of discoloration | Symbol |
|---|---|---|---|---|---|
| Toward yellow | Y | Toward green | G | Thickens | Str |
| Toward red | R | Becomes vivid | Gr | Thins | W |
| Toward blue | BL | Becomes dull | D | | |

Examples  1. $\Delta E_{ab}^* = 5.2(Y)$

2. $\Delta E_{ab}^* = 7.6(D,R)$ 5.5 <u>Light Transmittance and Total Light Reflectance</u>

5.5.1 <u>Summary</u>

(1) For thin test pieces, and also for thick test pieces whose haze value is small, the light transmittance shall be obtained by measuring the quantity of total transmitted light and the quantity of scattering light by method A by using an integrating sphere type measuring apparatus and calculating therefrom the total light transmittance and diffuse transmittance, and then the parallel light transmittance as the difference between those two transmittances.

(2) For test pieces of which the haze value is large (30 % or larger) and the thickness is large (the thickness being 1/10 of the diameter of the aperture), the loss of light from the edge due to diffusion of light in the direction of thickness increases, so that the total light transmittance shall be obtained by measuring; method B which catches such a loss of light.

(3) The total light reflectance shall be obtained by measuring method B which uses an integrating sphere in which an angle is provided for the center angle of the integrating sphere referring so the optical axis.

5.5.2 <u>Measuring Method</u> A Measurement shall be performed as follows:

(1) <u>Apparatus</u> The principle of the optical system of the integrating sphere type light transmittance measuring apparatus is shown in Figs. 5 and 6. The apparatus shall meet the optical conditions shown in Table 4.

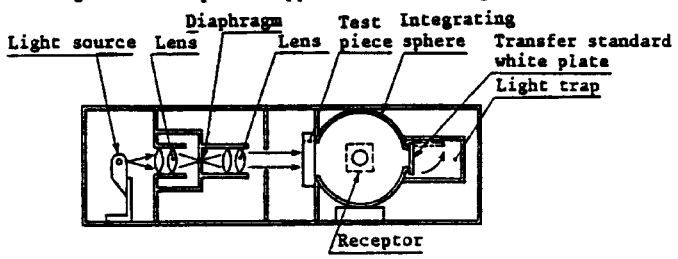
Fig. 5. Principle of Apparatus (Measuring Method A)
Remark: A visual filter may be inserted on the light source side.

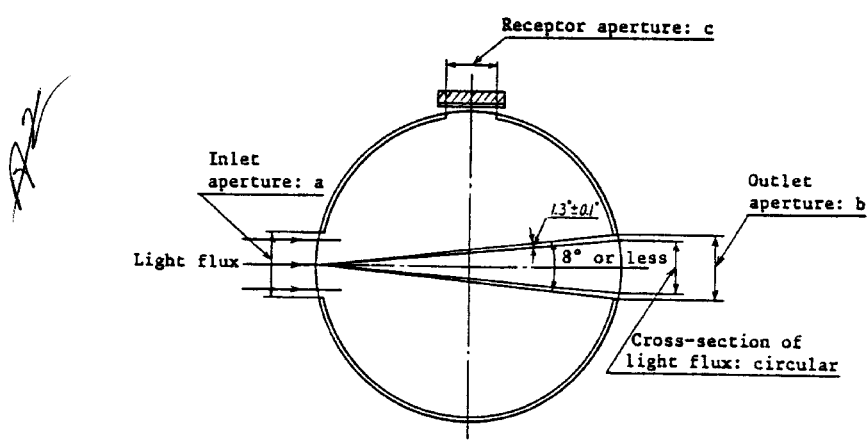
Fig. 6. Conditions of Integrating Sphere (Measuring Method A)

Table 4. Optical Conditions of Apparatus (Measuring Method A)

| Item | Conditions |
|---|---|
| Integrating sphere | The sum of the areas (a+b+c) of the inlet and outlet (the portions where the test piece and the transfer standard white plate are fitted) shall be 4% or less of the total inner surface area of the sphere (see Fig. 6)<br><br>The center lines of the outlet and inlet shall be on the same large circle of the sphere and the angle formed by the diameter of the outlet and the center of the inlet shall be 8 degrees or less. |
| Reflecting surface | The transfer standard white plate shall have a uniform high reflectance for all the wave lengths of visible light. Magnesium oxide, barium sulfate, aluminum oxide and the like are suitable for this purpose.<br><br>The inner wall of the integrating sphere shall be coated with a material having the same reflectance as the transfer standard white plate. |
| Light flux | The light flux which illuminate the specimen shall almost consist of parallel rays and shall not include light beams deviating by 3 degrees or more from the optical axis. The center of the light flux shall agree with the center of the outlet.<br><br>The cross-section of the light flux at the outlet shall be circular and distinct.<br><br>Further, the angle which is formed by the diameter of the light flux at the outlet referring to the center of the inlet shall be made smaller by $1.3 \pm 0.1$ degrees than the angle which is formed by the radius of the outlet.<br><br>The cross-section of the light flux at the outlet of the integrating sphere shall be as shown in Fig. 6. |
| Light trap | The light trap, when no test piece or no transfer standard white plate is fitted, shall completely absorb light. |
| Light source | The standard light A shall be used as the light source. |
| Receptor | The synthetic sensitivity of the receptor shall satisfy the value of Y of the Luther condition for the standard light C by the use of a visual filter. However, where particularly specified, measurement may be performed by using a device which satisfies the value of Y of the Luther condition for the standard light A. |

(2) Test Piece  The test pieces used shall be as follows:

(a) The dimensions of the test piece shall be 50 mm x 50 mm, and the thickness shall be the original thickness.

(b) The number of test pieces used shall be 3.

(3) Measuring Method  The measurement shall be performed according to the following procedures:

(a) Fit a transfer standard white plate, adjust the indicator of the apparatus at 100 ($T_1$), and adjust the quantity of the incident light.

(b) With the transfer standard white plate fitted, attach the test piece, and measure the quantity of the total transmitted light ($T_2$).

(c) Detach the transfer standard white plate and test piece, attach a light trap, and measure the quantity of scattering light of the apparatus ($T_3$).

(d) With the light trap attached, attach the test piece, and measure the quantity of scattered light produced by the apparatus and test piece ($T_4$)

(4) Method of Calculation  The total light transmittance, diffuse transmittance, and parallel light transmittance shall be calculated from the following formulas:

$T_t = T_2$ $T_d = (T_4 - T_3)(T_2/100)$ $T_p = T_t - T_d$

Where  $T_t$: total light transmittance (%)

$T_d$: diffuse transmittance (%)

$T_p$: parallel light transmittance (%)

(5) Expression of Results  The total light transmittance, diffuse transmittance and parallel light transmittance shall be calculated to the 1st decimal place and expressed as in the following Example:

Example: $T_t = 91.2$(%)    $T_d = 3.6$(%)    $T_p = 87.6$ (%)

5.5.3 <u>Measuring Method B</u> The measurement shall be performed as follows:

(1) Apparatus The principle of the optical system of the integrating sphere type measuring apparatus is essentially the same as that of the measuring method A, but the construction of the integrating sphere shall be as shown in Fig. 7 and satisfy the optical conditions shown in Table 5.

(a) In the case of test pieces having a high haze value and a large thickness, the test piece shall have a discular form and be hot in a test piece holder as shown in Fig. 7 and installed on the inner wall of the integrating sphere in order to catch the dissipating light caused by scattering of light. In this case, the test piece holder shall have metallic lustered surfaces.
  (b) The diameter of the light flux of the incident light may be adjusted by providing a mask on the optical path. In this case the surfaces of the mask shall be treated by black mat finishing Fig. 7 Conditions of Integrating Sphere (measuring Method B)

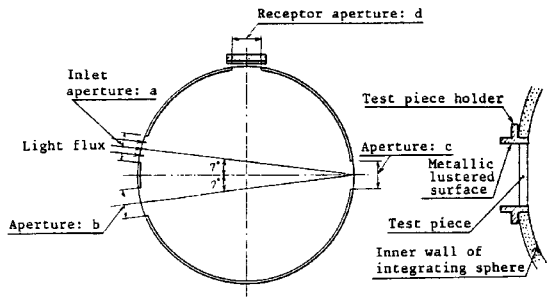

Table 5. Optical Conditions of Apparatus (Measuring Method B)

| Item | Conditions |
|---|---|
| Integrating sphere | The sum of the areas of the outlet and inlet of light (a+b+c+d) shall be not more than 4% of the total inner surface area of the sphere (see Fig. 7).<br>The center lines of aperture $a$ and aperture $c$ shall be on the same large circle of the sphere, and the angle formed between the center line of aperture $a$ to aperture $c$ and the center line of aperture $c$ to aperture $b$ shall be 14 degrees.<br>The areas of aperture $a$, $b$ and $c$ shall be equal. |
| Reflecting surface | Same as the reflecting surface of Table 4. |
| Light flux | The light flux illuminating the specimen shall almost consist of parallel rays and shall not contain light beams deviating by 3 degrees or more from the optical axis. The center of the light flux shall agree with the center of aperture $a$.<br>The cross-section of the light flux shall be circular and distinct.<br>The diameter of the cross-section of the light flux at aperture $a$ shall be 0.5 to 0.6 times the specimen diameter. However, this shall not apply where the reflectance of an opaque specimen is measured. |
| Light trap | Same as the light trap of Table 4. |
| Light source | Same as the light source of Table 4. |
| Receptor | Same as the receptor of Table 4. |

(2) <u>Test Piece</u> The test pieces used shall be as follows:

(a) Where the test piece is thin, and even if it is thick, where the haze value is small (less than 30 %), the dimensions of the test piece shall be 50mm x 50 mm and the thickness shall be the original thickness. In the case of a test piece with a large thickness and a large haze value (30 % or more) and in the case of measuring reflectance, the test piece shall be circular and have the correct size to contact closely with the inner side of the test piece holder. In this case, the side surfaces of the test piece shall be applied with a white paint.

(b) The number of test pieces used shall be 3.

(3) <u>Measuring Method</u> The following procedures shall be followed:

(a) Attach transfer standard white plates at apertures b and c, adjust the indicator of the apparatus to 100 ($T_1$), and adjust the quantity of incident light.

(b) Under the conditions of (a), attach the test piece to aperture and measure the quantity of transmitted light ($T_2$)

(c) Attach a transfer standard white plate to aperture c and attach a light trap to aperture b and measure the quantity of incident light ($T_3$).

(d) Attach the test piece attached with a light trap or black felt to aperture c, attach a transfer standard white plate to aperture b, and measure the quantity of reflected light ($T_4$). However, for an opaque test piece, a light trap or black felt is not required.

(e) In the case of measuring reflectance only, it is sufficient only to perform the measurements of (a), (c) and (d).

(4) Method of Calculation  The total light transmittance and total light reflectance shall be calculated from the following formulas $$T_t = \frac{T_2}{2T_1 - T_3 - k(T_1 - T_3)(1-R)} \times 100$$

$$R = \frac{T_4}{T_1 - k(T_1 - T_3)(1 - T_4/T_1)} \times 100$$

Where:  $T_t$: total light transmittance (%)

R: total light reflectance (%)

k: area of test piece / area of aperture

Remarks  1. Where the ratio of aperture area to total inner surface area is small and the loss of light due to scattering from the apertures is small, the total light transmittance $T_t$ (%) and total light reflectance R (%) may be calculated from the following formulas:

$$T_t = \frac{T_2}{T_1} \times 100 \qquad R = \frac{T_4}{T_1} \times 100$$

2. In a light diffusing object which absorbs almost no light (for example, methacrylate resin milk half plate), $T_t + R$ is almost 100. In this case, if the ratio of diameter to thickness of the test piece is 3 to 4 or larger (for example, a test piece with a diameter of 20 mm to a thickness of about 6 mm), the scattering loss of light in the direction of test piece thickness can almost be recovered. Where the thickness ratio is smaller than this, the diameter of the test piece shall be made larger and, in addition, an integrating sphere with a larger diameter shall be used.

(5) Expression of Results  The total light transmittance and total light reflectance shall be calculated to the 1st decimal place and expressed as in the following Example:

Example: $T_t$ = 60.2 (%)   R=39.5 (%)

6. Testing Methods for Special Optical Characteristics

6.1 Optical Angular Deviation 6.1.1 <u>Summary</u> The displacement of the image of the crosslines which are rejected through the specimen from the cross-haired slide by a projector shall be examined, and the maximum angular deviation thus obtained shall be expressed in minutes 6.1.2 <u>Apparatus</u> The apparatus used shall consist of the following parts, and the optical mechanism is shown in Fig. 8.

(1) <u>Projector</u> The projector shall be provided with a light source and lenses capable of forming a distinct image on the screen placed opposite to the projector, and its objective lens shall have a diameter of about 50 mm and a focal length of about 305 mm.

(2) <u>Slide Plate</u> The slide plate shall consist of a transparent plate with two distinct black lines perpendicularly crossing at the center of the plate.

(3) <u>Screen</u> The screen shall consist of a square white plate with a side length of about 1.5 m and have two base lines perpendicularly crossing at the center of the plate, and in addition, black lines(6) drawn parallel to those base lines, showing angular deviations of 5', 7', 9', 12', 14' and 20', as well as two parallel lines drawn at a distance of 254 mm from those two base lines. The thickness of these lines shall be about 1.6 mm.

Fig. 8. Optical Mechanism of Optical Angular Deviation Measuring Apparatus

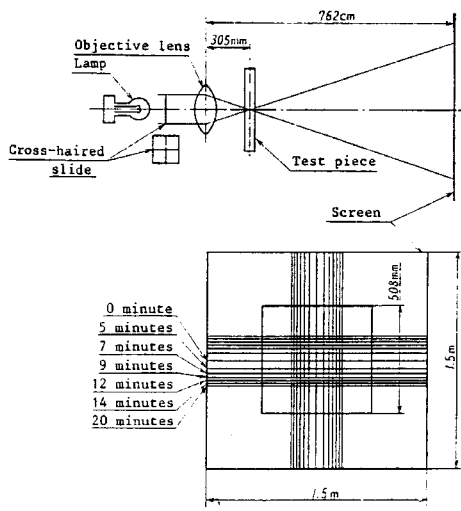

Note (6) The relationship between the distance from the lines on the screen and the angular deviation s be calculated from the following formula:

$$\tan \theta = 1\text{cm}/732 \text{ cm} = 0.001366$$

$$\theta = 4.7'  \text{ minutes for 1 cm length on the screen}$$

(4) <u>Dark Room</u> The dark room used shall preferably have sufficient pace for assembling the apparatus and such a degree of afar as to allow the image on the screen to be distinctly perceived 6.1.3 <u>Test Piece</u> The size of the test piece shall be 100 mm x 100 mm or larger with a thickness equal to the original thickness.

6.1.4 <u>Measuring Method</u> The measurement shall be performed accordance with the following procedures:

(1) <u>Angular Deviation</u> Place the screen vertically to the projected light at a distance of 762 cm from the front lens of the projector. Insert a slide with crosslines drawn on it in the projector adjust the projector and its lenses so that the images of t crosslines correctly fall on the central base lines drawn on the screen.
Then place the test piece vertically at a position about 305 mm distant from the lens so that the test piece surface is to the optical axis, and move the plate so that all the surfaces more than 25 mm inside of the circumference of the plate more horizontally in the light flux. During this operation, exit the displacement of the images of the crosslines and measure maximum angular deviation in minutes.
Then rotate the specimen plate through 90 degrees in its plane and repeat the above measurement.

(2) <u>Local Defects</u> As in the case of measuring angular deviation place the test piece vertically in front of the objective lens apply a light flux to local defects to observe whether or no linear images from the slide produce an angular deviation or minutes or more within a distance of 508 mm on the screen.

6.1.5 <u>Expression of Results</u>

(1) The angular deviation shall be expressed by the maximum angle deviation in minutes.

(2) Local defects shall be reported by showing whether or not the linear images of the slide produce an angular deviation of 5 minutes or more.

6.2. <u>Glare-proofness</u>

6.2.1 <u>Summary</u> The glossiness of test pieces treated for prevents glare so that no glare is perceived by the eye shall be measured with a glossmeter to obtain the glare-proofness of the test pieces.

6.2.2 <u>Apparatus</u> For the apparatus for measurement of glare-proofness a glossmeter as specified in 5.2 Glossiness shall be used. However, the measuring condition used shall be the condition for 20-degree specular glossiness Specified in Table 1, and the size of the light flux incident on the specimen shall be 10 mm or less in diameter 6.2.3 <u>Measuring Method</u> The measurement shall be performed by the method Of 5.2 Glossiness.

6.2.4 <u>Expression of Results</u> Glare-proofness shall be expressed in integer by appending the angle of glossiness 20° in parentheses after the symbol of glare-proofness $G_s$, as shown in the following Example. In this case, % may be omitted.

Example: $G_s$ (20°) = 32 (%)

6.3 <u>Yellowness and Yellowing Factor</u>

6.3.1 <u>Summary</u> The measurement shall be performed to obtain the degree in which the hue of colourless or nearly white plastic materials, formed materials, and the like moves toward yellow. Further, the yellowing factor shall be obtained by the difference in yellowness produced when those materials are exposed to light, heat or other conditions.

6.3.2 <u>Apparatus</u> A photoelectric calorimeter as specified in 5.3.3 (2) shall be used along with the standard light C as the light for measurement. The optical conditions for the reflection measuring method shall be such that illumination is applied from the direction of 45 degrees and the reflected light in the vertical direction is received. However, other calorimeters nay also be used on agreement between the parties concerned.

6.3.3 <u>Specimen</u> The number of test specimens or test pieces used shall be 3.

6.3.4 <u>Measuring Method</u> The tristimulus values of the specimen shall be measured under the following conditions and the yellowness and yellowing factor shall be obtained from the calculation formula specified in 6.3.5. In this case, because the yellowness and yellowing factor are influenced by the thickness and shape of the test specimen or test piece, comparison between measured values shall be based on the comparison between specimens or test pieces having the same thickness and shape.

(1) <u>Colorimetric Conditions</u> The following calorimetric conditions shall be used:

(a) <u>Reflection Method</u> As shown in Fig. 9 calorimetric measurement shall be performed by the reflection method with a measuring area of 50 mm in diameter, with the test piece without a backing plate on the back side and covered by a shield to shut off outside light. However, measurement may also be performed with a measuring area of 30 mm in diameter on agreement between the parties concerned. In the case where a backing plate is used for unavoidable reasons, the kind of backing plate used or the tristimulus values shall be appended in the report.

Fig. 9 - Reflection Measuring Method

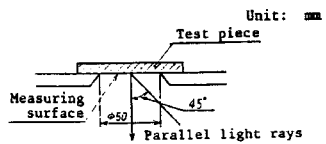

(b) <u>Transmission Method</u> As shown in Fig. 10, measurement shall be performed by the transmission measuring method with a measuring area of 12 mm diameter.

Fig. 10 - Transmission Measuring Method

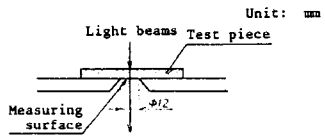

(3) <u>Measuring Conditions</u> Measurement shall be performed under following conditions:

(a) For opaque or translucent, filmy or platy specimens, measurement shall be performed by the reflection method.

(b) For transparent, filmy or platy specimens, measurement sh performed by the transmission method.

(c) For powdery specimens, measurement shall be performed by a container. The container used shall be one made of glass with a shape as shown in Fig. 11 and have a transmittance 0 % for wave length of 270 nm or less and 90 % or higher wave length of 400 nm or more, and the measurement shall performed by the reflection method with a measuring area 50 mm diameter.

When filling the container with the specimen, and aft thoroughly shaking the container without applying pressure from the above to homogenize the density of the specimen packed inside, the excess amount of specimen shall be removed with a plate such as a smooth-surfaced spatula.

Fig. 11

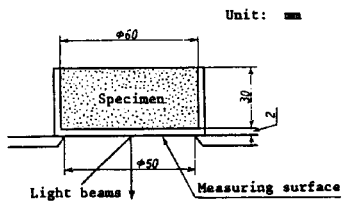

(d) For specimens of pellet form, measurement shall be performed as in the case of powdery specimens. However, for transparent or translucent specimens, the measurement shall be performed with the glass container shielded with a black covering to shut off outside light. In this case, no backing plate shall be used.

(e) For specimens in thread form, the specimen shall be wound uniformly around an aluminium measuring frame as shown in Fig. 12, and measurement shall be performed by the reflection method with a measuring area of 50 mm diameter by making the thread winding direction agree with the direction of the incident light. When winding the specimen around the measuring frame, care shall be taken to maintain the specimen thickness almost uniform by winding it in multi-layers so that there are produced no gaps.

Fig. 12

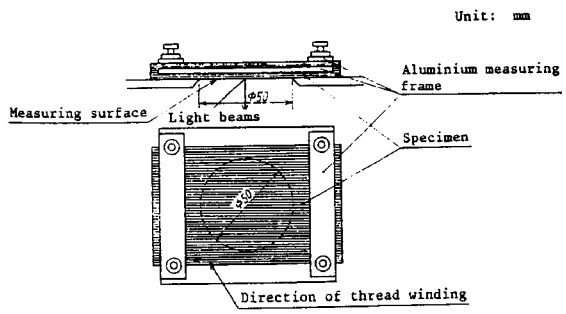

(f) For liquid specimens, the measurement shall be performed transmission method by using a container 60mm in diameter 60mm in depth made of the same material as in the case powdery specimens, with a liquid depth of 50 mm. The depth of the specimen may be altered on agreement between the parties concerned, but in that case, the liquid depth shall also reported.

6.3.5 <u>Method of Calculation</u> The calculation shall be performed as follows:

(1) <u>Calculation of Yellowness</u> The yellowness shall be calculated from the following formula:

$$YI = \frac{100(1.28X - 1.06Z)}{Y}$$

where  YI: yellowness
X, Y, Z : tristimulus values of test specimen or test piece for standard light C Remark: If YI obtained by this calculation shows a positive value, it represents the magnitude of yellowness (2) <u>Calculation of Yellowing Factor</u> The yellowing factor shall calculated from the following formula:

$$\Delta YI = YI - YI_o$$

where  $\Delta YI$: yellowing factor
YI: yellowness after change
$YI_o$: initial yellowness of test specimen or test piece Remark: If $\Delta YI$ obtained by this calculation shows a positive value, it indicates that yellowness has increases 6.3.6 <u>Expression of Results</u> The yellowness and yellowing factor be expressed to the 1st decimal place.

6.4 <u>Haze</u> (Cloudiness Value)

6.4.1 <u>Summary</u> The haze (cloudiness value) shall be represented by ratio of diffuse transmittance to total light transmittance measured by integrating sphere type light transmittance measuring apparatus.

6.4.2 <u>Apparatus</u> An integrating sphere type light transmittance me apparatus as specified in 5.5 Light Transmittance shall be used.

6.4.3 <u>Test Piece</u> The test pieces as specified in 5.5.3 shall be used 6.4.4 <u>Measuring Method</u> The diffuse transmittance and total light transmittance shall be measured by the same procedures as in 5.5.3.

6.4.5 <u>Method of Calculation</u> The haze (cloudiness value) shall be calculated from the following formula:

$$H = \frac{T_d}{T_t} \times 100$$

where  H: haze (cloudiness value)(%)
       $T_d$: diffuse transmittance (%)
       $T_t$: total light transmittance (%)

6.4.6 Expression of Results The haze (cloudiness value) shall be calculated to the 1st decimal place and indicated as in the following Example:

Example: H=4.5(%), H=76.3(%)

6.5 Retrogressive Reflection Property 6.5.1 Summary The measurement shall be performed to obtain the retrogressive reflection property of the specimen and be indicated by the intensity of reflection.

6.5.2 Apparatus The principle of the measuring apparatus is shown in Fig. 13. The standard light A shall be used as the light source, and the spectral sensitivity of the receptor shall agree with the relative luminous efficacy of a standard observer.

Fig. 13 - Principle of Measuring Apparatus

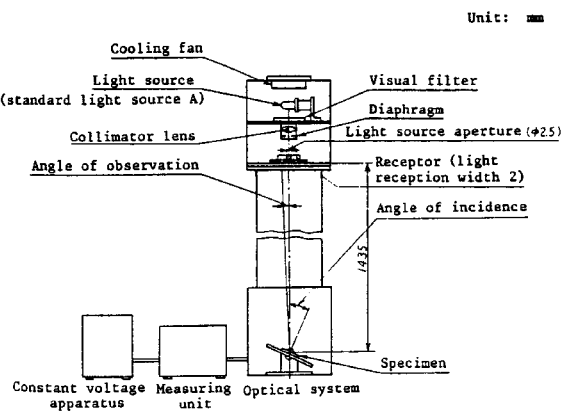

6.5.3 <u>Test Piece</u> The size of the test piece shall be 75 mm x 45 mm or larger and the thickness shall be the original thickness.

6.5.4 <u>Measuring Conditions</u> The angle of incidence means the direction of the specimen relative to the light source, and the angle of observation indicates the position of the observer receiving the retrogressive reflection relative to the optical axis of the incident light. According to the purpose of observation, the angle of incidence shall be -50°, -40°, -30° -20°, -10. -4°, 0°, 10°, 20°, 30° 40° or 50° (the lefthand and righthand directions perpendicular to the plane containing the angle of observation shall respectively shown as + and -), and the angle of observation shall be 0.2°, 0.3°, 0.5°, 1.5° or 2.0° as a standard, and any combinations of these two kinds off angles may be used on agreement between the parties concerned.

6.5.5 <u>Measuring Method</u> Calibration curves shall be prepared preliminarily by using two calibrating test pieces whose values of reflection intensity have preliminarily determined, and after adjusting the graduation of the measuring apparatus by using one of the calibrating test pieces, the test specimen shall be subjected to measurement and the intensity of reflection Of the specimen shall be obtained from the calibration curve.

6.5.6 <u>Method of Determination of Reflection Intensity Values of Calibrating Test Pieces</u> The values of intensity of reflection of the calibrating test nieces shall be determined by measuring the illuminance on the receptor, produced by the reflection from the calibration test piece at the angle of incidence for each angle of observation, under the conditions of angle of incidence and angle of observation specified in 6.5.4 by placing a projector (which uses the standard light A as the light source, emits parallel light flux, and has a diameter of 50 mm) and a receptor (which agrees with the standard relative luminous efficacy and has a reception aperture of 12.7 mm x 25.4 mm in size) 30 m or more apart from the calibrating rest piece; then the intensity of reflection shall be calculated from the following formula:

$$R = \frac{E_r d^2}{E_s A}$$

where R: intensity of reflection
$E_r$: illuminance on receptor produced by reflected light from specimen (lx)
$E_s$: normal illuminance produces by incident light at the position of specimen (lx)
A: surface area of specimen (m²)

Depending on the purpose of measurement, the illuminance applied on a unit surface area (10 cm²) of the calibrating test piece may be adjusted to 10.76 lx and the intensity of reflection used shall be cd/10.76 lx.

6.5.7 <u>Expression of Results</u> The intensity of reflection shall be expressed by integer. In addition, the angle of incidence and the angle of observation shall be appended as in the following Example:

Example: R =96, angle of incidence -4°, angle of observation 0.2°

6.6 Distinctness of Image 6.6.1 Summary The distinctness of image shall be calculated from the results obtained by measuring the light transmitted through or reflected by the specimen through a moving optical comb by using a measuring apparatus for distinctness of image. However, the measurement shall be performed by the transmission method for transparent specimens and by the reflection method for opaque or transluscent specimens.

6.6.2 Apparatus The principle of the apparatus based on the transmission method is shown in Fig. 14, and that of the apparatus based on the reflection method is shown in Fig. 15. The apparatus shall consist, as shown in Figs. 14 and 15, of an optical system in which the light passed through a slit and made into parallel light beams is applied to the specimen, perpendicularly in the case of the transmission method and at an angle of 45° in the case of the reflection method, and the transmitted light or regular reflection light is detected through a moving optical comb, and of a measuring system which records the variation in the detected light quantity as wave form; in addition, the apparatus shall meet the following requirements:

(1) The light source used shall be of the S-C-8 type specified in JIS C 7711 with a filament thickness of 0.05 mm or less in diameter, and shall provide a constant light quantity during measurement.

(2) The width of the slit shall be $0.03 \pm 0.005$ mm.

(3) The optical comb used shall be such that the ratio between the widths of the dark part and the light part is 1: 1, the width of those parts consists of the four stages of 0.125 mm, 0.5 mm, 1.0 mm and 2.0 mm, and the moving speed is about 10 mm/min (4) The wave height of the wave forms measures without the specimen attached in the case of the transmission method, and that measured under the condition in which a black glass standard surface(7) is fitted on the specimen base in the case of the reflection method shall be equal when the light is passed through either one of the four kinds of optical comb widths.

Note (7) The black glass standard stir-ace used shall be a smooth surface of black glass as specified in 5.2.3 (2).

(5) The output of the receptor shall on capable of being adjusted so that the correct value of distinctness of image can be obtained even for specimens whose transmittance or reflectance is low.

Fig. 14 - Principle of Measuring Apparatus by Transmission Method

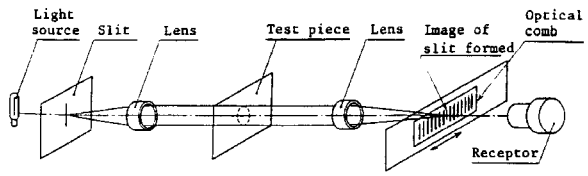

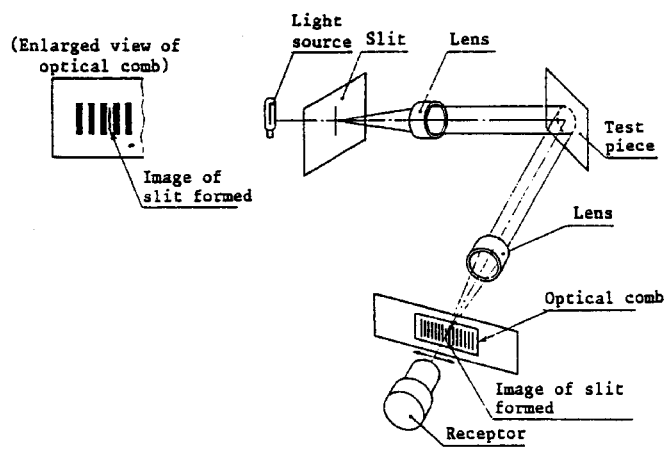
Fig. 15. Principle of Measuring Apparatus by Reflection Method 6.6.3 <u>Test Piece</u> The test pieces shall be as follows:

(1) The size of the test piece shall be 50 mm x 50 mm, with the thickness being the original thickness.

(2) The number of test pieces used shall be 3.

6.6.4 <u>Measuring Method</u> The measurement shall be carried Out as follows:

(1) With the specimen base Of the apparatus in the condition without the specimen attached in the case of the transmission method, and in the condition with a black glass standard surface attached in the case of the reflection method, move the Optical comb and record the wave form Of the received light (see Fig. 16). In this case, make adjustment so that the recorded wave height for the dark part of the optical comb becomes zero.

(2) After attaching the specimen to the specimen base, move the optical comb to make adjustment so that the maximum recorded wave form comes to a suitable position on the recording paper sheet in order to facilitate the measurement.

(3) Perform measurement by moving the optical comb within the range of a prescribed width and reading the maximum wave height (m) and minimum wave height (m)on the recording paper sheet (see Fig. 17)

(4) Perform measurement with respect to both the longitudinal and transverse directions of the test piece.

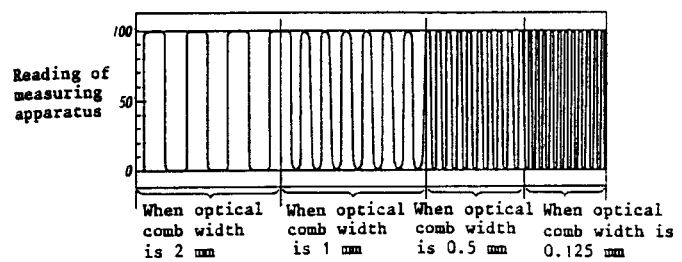
Fig. 16. Wave Forms of Received Light without Specimen and with Black Glass Standard Surface (In the Case of an Optical Comb Having 4-Staged Width)

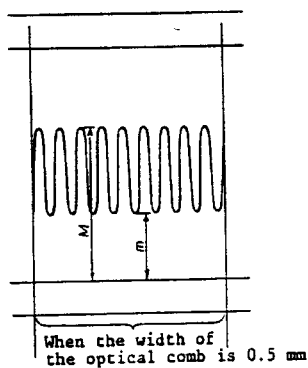
Fig. 17. An Example of Wave Form of Received Light by Specimen
(In the Case of 0.5 mm Optical Comb Width)

When the width of the optical comb is 0.5 mm, $$M = 55, \quad m = 25, \quad C = \frac{55-25}{55+25} \times 100 = 37.5\%$$

6.65 <u>Method of Calculation</u> The distinctness of image shall be calculated from the following formula $$C = \frac{M - m}{M + m} \times 100$$

where C: distinctness of image (%)
M: maximum wave height
m: minimum wave height 6.6.6 <u>Expression of Results</u> The distinctness of image shall be express to the 1st decimal place, with the optical comb width used appended in pares theses, as shown in the following Example:

Example: Longitudinal $C_{(0.5)} = 37.5\%$

Transverse $C_{(0.5)} = 37.0\%$ 6.7 <u>Fluorescent Colour</u>

6.7.1 <u>Summary</u> The fluorescent colour shall be obtained by calculating the chromaticaly coordinates $x_f$, and $y_f$, from the tristimulus values $X_f$, $Y_f$, and $Z_f$, measured by a xenon fluorescence calorimeter.

6.7.2 <u>Apparatus</u> The apparatus used shall be a xenon fluorescence calorimeter. The xenon fluorescence calorimeter shall use as the light sour a xenon standard white light source as specified in JIS Z 8902 and be capable of measuring $X_f$, $Y_f$, and $Z_f$, directly from the indication of the meter and shall satisfy the Luther condition sufficiently. The geometric conditions of illumination and light reception shall be as such that illumination is applied from the direction of 45° relative to the specimen surface and the reflection in the normal direction is received. The principle of the xenon fluorescence calorimeter is shown in Fig. 18.

Fig. 18 - Principle of Xenon Fluorescence Colorimeter

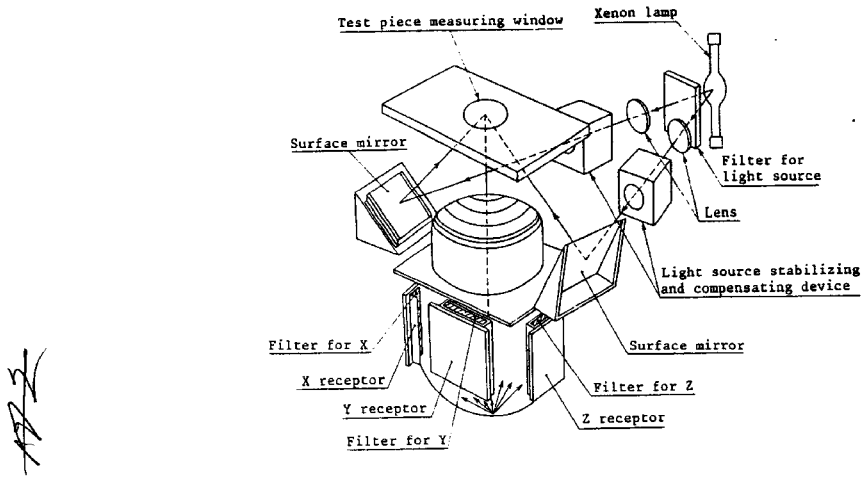

Remark: The filter used for the light source shall be as specified in Table 3 of JIS Z 8902.

6.7.3 <u>Measuring Method</u> After adjusting the graduation of the xenon fluorescence calorimeter according to 5.3.2 of JIS Z 8722, the tristimulus values $X_f$, $Y_f$, and $Z_f$ shall be measured. However, the backing material for the Specimen used during measurement shall be black felt, as a rule, but a working standard white plate or white enamelled plate may also be used on agreement between the parties concerned. In addition' the tristimulus values X, Y and Z of the white plate used should desirably be appended in the report.

6.7.4 <u>Method of Calculation</u> The chromaticity coordinates $x_f$, $y_f$ shall be calculated from the tristimulus values $X_f$, $Y_f$ and $Z_f$ obtained by measurement according to the following formulas:

$$x_f = \frac{X_f}{X_f + Y_f + Z_f}$$

$$y_f = \frac{Y_f}{X_f + Y_f + Z_f}$$

6.7.5 <u>Expression of Results</u> The measured values of Stimulus value $Y_f$ shall be calculated to the 1st decimal place and those of chromaticicy coordinates $x_f$ and $y_f$ to the 3rd decimal place, and be expressed as in the following example:

Example: $Y_f$=24.2(%)   $x_f$=0.621   $y_f$=0.317

7. Report

The following items shall be written in the report, as required.
(1) Type of test, kind and grade of material tested, code number of manufacturer
(2) Method of preparing test piece
(3) Conditioning of test piece
(4) Shape and dimensions of test piece
(5) Number of test pieces tested
(6) Atmospheric conditions of testing room
(7) Test conditions
(8) Test results (mean value, standard deviation or the maximum and minimum values)
(9) Type and designation of test apparatus
(10) Date of test
(11) Other items considered necessary. — —

What is claimed is:

1. An oriented laminated polyester film for pasting on car windows, comprising at least three layers including at least one intermediate layer being incorporated with a dye, which the laminated polyester film satisfies the following formulae ① to ⑥ simultaneously:

$$CA/CB \leq 0.5 \quad \text{①}$$
$$0.02 \leq DA/DZ \leq 0.8 \quad \text{②}$$
$$1.0 \leq SMD \leq 5.0 \quad \text{③}$$
$$STD \leq 1.5 \quad \text{④}$$
$$0.005 \leq Ra \leq 0.05 \quad \text{⑤}$$
$$H \leq 5 \quad \text{⑥}$$

wherein CA represents a dye concentration (%) in the outermost layers on both sides, in case where the dye concentrations in the outermost layers are different, CA represents a dye concentration the outermost layer with a higher dye concentration; CB represents a dye concentration (%) in the intermediate layer, in case where there exist plural intermediate layers, CB represents an average of the dye concentrations in the layers excluding the outermost layers on both sides; DA represents a sum of the thicknesses ($\mu$m) of the outermost layers; DZ represents an overall thickness ($\mu$m) of the whole layers; SMD represents a heat shrinkage (%) in the machine direction of the film when heat-treated at 180° C. for 5 minutes; STD represents a heat shrinkage (%) in the transverse direction of the film when heat-treated at 180° C. for 5 minutes; Ra represents a center line average roughness ($\mu$m) of the film surface; and H represents film haze (%).

2. An oriented laminated polyester film according to claim 1, wherein the ratio of DA/DZ in the formula ② is 0.08 to 0.6.

3. An oriented laminated polyester film according to claim 1, wherein the ratio of DA/DZ in the formula ② is 0.15 to 0.5.

4. An oriented laminated polyester film according to any one of claims 1 to 3, wherein a coating layer followed by a hard coat layer are provided successively on the surface of one of the outermost layers, and said coating layer has an enhanced adhesion property against the hard coat layer.

* * * * *